United States Patent
Mengelberg

(10) Patent No.: US 10,227,905 B2
(45) Date of Patent: Mar. 12, 2019

(54) SUPPORTING STRUCTURE, DEVICE FOR TREATING EXHAUST GASES, AND METHOD FOR THE PRODUCTION THEREOF

(71) Applicant: CONTINENTAL AUTOMOTIVE GMBH, Hannover (DE)

(72) Inventor: Markus Mengelberg, Overath (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/485,703

(22) Filed: Apr. 12, 2017

(65) Prior Publication Data
US 2017/0218817 A1 Aug. 3, 2017

Related U.S. Application Data

(63) Continuation of application No. PCT/EP2015/073922, filed on Oct. 15, 2015.

(30) Foreign Application Priority Data

Oct. 16, 2014 (DE) .................. 10 2014 115 063

(51) Int. Cl.
| | |
|---|---|
| F01N 3/20 | (2006.01) |
| B01J 35/04 | (2006.01) |
| F01N 3/28 | (2006.01) |
| F01N 3/027 | (2006.01) |
| F01N 13/00 | (2010.01) |
| B01J 35/00 | (2006.01) |
| B01D 53/94 | (2006.01) |
| B01J 37/02 | (2006.01) |

(52) U.S. Cl.
CPC .......... *F01N 3/2026* (2013.01); *B01D 53/94* (2013.01); *B01J 35/0033* (2013.01); *B01J 35/04* (2013.01);
(Continued)

(58) Field of Classification Search
CPC ...... F01N 3/281; F01N 3/2842; F01N 3/2026; B01D 35/94; B01J 35/04
(Continued)

(56) References Cited

U.S. PATENT DOCUMENTS 5,525,309 A * 6/1996 Breuer .................. B01J 35/04
422/174
5,768,889 A 6/1998 Maus et al.
(Continued)

FOREIGN PATENT DOCUMENTS

| CN | 1198797 A | 11/1998 |
|---|---|---|
| CN | 1865673 A | 11/2006 |

(Continued)

OTHER PUBLICATIONS

International Search Report and Written Opinion dated Feb. 2, 2016 from corresponding International Patent Application No. PCT/EP2015/073922.
(Continued)

*Primary Examiner* — Tom P Duong

(57) ABSTRACT

Supporting structure having a first side surface and a second, opposite side surface, wherein the supporting structure has an electrical insulation which prevents an electrical current flow from the first side surface to the second side surface; wherein, furthermore, the supporting structure comprises at least one web which bridges or encloses a cross-sectional area, and wherein the supporting structure has a plurality of first pins and second pins which extend on both sides of the cross-sectional area.

7 Claims, 4 Drawing Sheets

(52) U.S. Cl.
CPC ............ *F01N 3/027* (2013.01); *F01N 3/281* (2013.01); *F01N 3/2842* (2013.01); *F01N 13/0097* (2014.06); *B01D 2255/806* (2013.01); *B01J 37/0225* (2013.01); *F01N 2240/16* (2013.01); *F01N 2330/02* (2013.01); *F01N 2330/04* (2013.01); *Y02T 10/26* (2013.01)

(58) Field of Classification Search
USPC .................................................. 422/174, 180
See application file for complete search history.

(56) References Cited

U.S. PATENT DOCUMENTS

| | | | | |
|---|---|---|---|---|
| 8,164,034 | B2 * | 4/2012 | Konieczny | B01D 46/0024 219/520 |
| 2010/0126984 | A1 | 5/2010 | Konieczny et al. | |
| 2014/0290229 | A1 | 10/2014 | Hirth et al. | |

FOREIGN PATENT DOCUMENTS

| | | |
|---|---|---|
| CN | 102112712 A | 6/2011 |
| CN | 103748328 A | 4/2014 |
| DE | 199 43 846 A1 | 3/2001 |
| DE | 100 55 447 A1 | 6/2002 |
| DE | 10 2007 025 417 A1 | 12/2008 |
| DE | 10 2011 120720 A1 | 6/2013 |
| EP | 0 783 621 B1 | 3/1998 |
| JP | H11 253 814 A | 9/1999 |
| WO | 92 13 636 A1 | 8/1992 |

OTHER PUBLICATIONS

German Search Report from corresponding German Patent Application 10 2014 115 0635 dated May 27, 2015.

Office Action dated Aug. 8, 2018 from corresponding Chinese Patent Application No. 201580055760.5.

* cited by examiner

SUPPORTING STRUCTURE, DEVICE FOR TREATING EXHAUST GASES, AND METHOD FOR THE PRODUCTION THEREOF

CROSS-REFERENCE TO RELATED APPLICATIONS

This application claims the benefit of PCT Application PCT/EP2015/073922, filed Oct. 15, 2015, which claims priority to German Application DE 10 2014 115 063.5, filed Oct. 16, 2014. The disclosures of the above applications are incorporated herein by reference.

FIELD OF THE INVENTION

The present invention relates to a supporting structure used in exhaust-gas aftertreatment systems of motor vehicles. The present invention also relates to a device for the treatment of exhaust gases, and to a method for the production of a device for the treatment of exhaust gases.

BACKGROUND OF THE INVENTION

To limit the emissions of pollutants of internal combustion engines, in particular in motor vehicles, catalytic converters and/or particle filters or the like have long been used for purifying the exhaust gas. In order for catalytically assisted conversion of the pollutants to occur, the exhaust gas and/or the catalytic converter or the particle filter must be at a predefined minimum temperature. In particular after a cold start or restart of the internal combustion engine, it is often the case that such a minimum temperature has not yet been reached. It is therefore sought to increase the temperature of the exhaust gas and/or of the catalytic converter or particle filter by way of electrically operated heating elements.

For example, EP-B1-0783621 has disclosed an electrically heatable catalytic converter which is formed with two honeycomb bodies. The first honeycomb body is in this case connected to an electrical voltage source, and may be flowed through by current. Owing to the ohmic resistance heating, the sheet metal foils of the first honeycomb body are then significantly heated, wherein the catalytic coating, which is in contact therewith, of the first honeycomb body and/or the exhaust gas flowing through the first honeycomb body is heated. For stability reasons, it is furthermore provided that the first honeycomb body is supported by way of pins and holding elements against a second honeycomb body arranged downstream. Furthermore, the pins and holding elements are suitable for electrically insulating the two honeycomb bodies with respect to one another. Such an embodiment of an electrically heatable catalytic converter is already well proven, but still requires relatively high outlay for production.

The connection of two honeycomb bodies by way of pins is generally realized such that the pins engage both into a cavity of the first honeycomb body and into a directly oppositely situated cavity of the second honeycomb body. The production of the connection has however proven to be relatively difficult, because it is difficult to achieve an aligned and/or parallel orientation of the cavities of adjacent honeycomb bodies. This is the case in particular when the honeycomb bodies are formed from wound sheet-metal layers, and the exact positioning of the cavities after the winding cannot be accurately predicted and/or set, giving rise to increased production costs and a relatively long assembly duration.

SUMMARY OF THE INVENTION

It is therefore an object of the present invention to at least partially solve the problems highlighted with regard to the prior art. In particular, it is also sought to specify a supporting structure by way of which a connection of an electrically energizable honeycomb body to a further honeycomb body may be realized as easily and quickly as possible. Furthermore, the supporting structure should nevertheless be of stable design and flexible in terms of use. Furthermore, the supporting structure should have targeted electrically insulating characteristics and permanently withstand the ambient conditions in an exhaust system.

It is furthermore sought to specify a device comprising at least two honeycomb bodies and at least one supporting structure which connects the honeycomb bodies to one another, wherein the device is produced easily and quickly and is realized overall with a small number of individual parts. Furthermore, the device should be easy to repair and at the same time stabilized by the supporting structure. A further focus is on maintaining a controllable current flow through the electrically energizable honeycomb body even under a wide variety of ambient conditions, in particular taking into consideration the thermal expansion behavior with regard to temperature fluctuations and/or pressure pulses in the exhaust-gas aftertreatment system. Furthermore, the device should generate a relatively low pressure loss when the device is flowed through by an exhaust gas. Furthermore, it is also sought to specify a method for producing a corresponding device.

It is furthermore sought to specify a method by way of which electrically energizable honeycomb bodies may be produced more easily, in particular narrow electrically energizable "honeycomb bodies" with a large outer diameter.

The aforementioned objects are achieved by way of a supporting structure, a device and a method as per the features of the independent patent claims. Further advantageous refinements of the invention are specified in the dependent patent claims. It is pointed out that the features specified in the dependent patent claims may be combined with one another in any desired technologically expedient manner and define further embodiments of the invention. Furthermore, the features specified in the patent claims are rendered more precisely and explained in the description, with further preferred refinements of the invention being presented.

For this purpose, use may be made of a supporting structure having a first side surface and having a second, oppositely situated side surface, wherein the supporting structure has an electrical insulator which prevents an electrical current flow from the first side surface to the second side surface. The supporting structure furthermore comprises at least one web which spans or encloses a cross-sectional area. Furthermore, the supporting structure has a multiplicity of first pins and second pins which extend to both sides of the cross-sectional area. In particular, the first pins extend away from the first side surface, and the second pins extend away from the second side surface.

The supporting structure is in particular set up and designed to permanently interact with exhaust gases of an internal combustion engine, that is to say the supporting structure is in particular resistant to high temperatures (e.g. temperatures above 600° C., or even above 800° C., or even above 950° C.). In particular, the supporting structure is designed to connect two honeycomb bodies to one another and/or support these against one another, that is to say the supporting structure has in particular a substantially (rigid or) dimensionally stable construction. Furthermore, the supporting structure may electrically insulate two honeycomb bodies with respect to one another. The supporting structure preferably has substantially only a corresponding holding function and insulating function.

The first side surface and the second side surface may be understood to be (mutually averted) sides of the surface of the supporting structure, and in particular also the surface of the at least one web. At least the first side surface or the second side surface may lie (exactly) in a (geometrical) plane with the cross-sectional area.

The at least one web spans, or substantially encloses, a cross-sectional area. If the web has, for example, an elongate form, it spans a cross-sectional area. If the web is for example formed in the manner of a frame, it encloses a cross-sectional area. In the usage situation focused on here, use is made of honeycomb bodies which have a diameter of at least 70 mm [millimeters], in particular at least 90 mm or even at least 120 mm. It is consequently preferable for the cross-sectional area covered/enclosed by the supporting structure and/or by the at least one web to be defined, for example, as follows: the diameter (QF) amounts to at least 45 mm [millimeters] or at least 90 mm or even at least 120 mm, and/or the surface area (QF) amounts to at least 45 cm$^2$ [square centimeters] or at least 60 cm$^2$ or even at least 110 cm$^2$. Here, a substantially circular or oval shape of the cross-sectional area is normally provided. The cross-sectional area is preferably defined by, and oriented parallel to, a face side of a honeycomb body.

The supporting structure may also comprise multiple webs, for example two webs which are connected and/or connectable to one another. The webs are preferably cohesively connected, for example soldered (brazed), sintered, welded or the like, to one another in the middle. The webs may alternatively and additionally be connected and/or connectable to one another in non-positively locking and/or positively locking fashion, for example in the manner of a tongue-and-groove connection. It is preferable for at least two webs to be formed on one another, in particular in the middle and/or centrally, and particularly preferably formed in one piece. The webs may be arranged in the form of a grid, a frame, a circle, a cross or the like. The webs may furthermore form an X shape, Y shape, Z shape, V shape, W shape or the like. It is likewise advantageous for the webs to be connected and/or connectable to one another such that they may move relative to one another. The webs may be designed to be rotatable relative to one another.

In particular, the pins are arranged on the at least one web and preferably on each web. The first pins and the second pins are preferably held by the web. For this purpose, the web may receive and/or hold at least one tip region of a respective pin.

The first pins and the second pins may be arranged at least partially in alignment with and/or parallel to one another. The first pins and the second pins may furthermore also be arranged at least partially offset with respect to one another. Here, an offset of the cavities may exist between the first honeycomb body and the second honeycomb body, which offset is compensated by way of the supporting structure, in particular by way of a relative movement of the first pins and/or of the second pins (in relation to the supporting structure) which is preferably performed during the assembly process. If the first pins and second pins are arranged so as to be at least partially (spatially) offset with respect to one another, the supporting structure may for example itself compensate a (radial and/or axial) offset of the first cavities of the first honeycomb body and of the second cavities of the second honeycomb body.

The supporting structure and/or the at least one web may have a multiplicity of pins, for example at least 5 pins, preferably at least 15 pins, or even at least 30 pins. With a high number of pins, it is possible to realize a stable connection of the first honeycomb body and of the second honeycomb body. To maintain a simple and inexpensive production process and also maintain adequately flexible retention in the exhaust system, it is recommended for at most 100 pins to be provided, preferably at most 80 pins or even at most 60 pins.

The at least one web and the pins may be formed with different materials. The web is preferably formed at least partially with a ceramic. The pins are preferably at least partially formed with a metal.

The electrical insulator may be part of the pins and/or part of the web. The web is preferably formed with an electrically insulating material. The web may at least partially be formed, in the region of the first side surface and/or of the second side surface, with an electrically insulating layer and/or coating or the like. Such a layer and/or coating may for example be formed with ceramic ($Al_2O_3$). The pins may be electrically insulating at least in the interior, and may be metallic on the outside, but not on the entirety of the outer side. The pins preferably have, on the outside, a metallic lining on at least a tip region. Here, it is also particularly preferable for the web and the pins to be formed on one another and/or to be formed in one piece, and more preferably jointly from an electrically insulating material, in particular a ceramic. Then, preferably (only) the tip regions, directed away from the web, of the pins are at least partially formed and/or lined and/or coated, on the outside, with a metal.

The electrical insulator prevents a flow of electrical current from the first side surface to the second side surface of the supporting structure. In particular, a current flow from at least one first pin to at least one second pin is prevented. In other words, during use, the electrical insulator prevents a flow of current from a first honeycomb body, which is connected to the first pins, to a second honeycomb body, which is connected to the second pins.

It is also preferable for at least one web to form an outer frame part and to be at least connected or connectable to at least one further web which points inward from the outer frame part. In particular, the outer frame part is in the form of a rectangular or circular or oval frame. The outer frame part preferably encloses a cross-sectional area which is also at least partially spanned by the at least one further web. Here, the "inside" refers to the region which is enclosed by the frame part. A direction toward the inside proceeds in particular from the frame part, and points into the middle of the cross section enclosed by the frame part.

The at least one further web points inward from the outer frame part and is preferably formed on the frame part. It is furthermore preferable for the frame part and the at least one further web to be formed in one piece. This is however not imperatively necessary, because the at least one further web may also be in movable fashion connected to the frame part. The web is preferably fixedly connected to the frame part. The web may in particular extend from one point to a further (spaced apart or even oppositely situated) point of the frame part. It is possible for at least three or at least four inwardly pointing webs connected to the frame part to be provided.

The webs may make contact with and be connected and/or connectable to one another. It is furthermore preferable for the webs to be connected and/or connectable to one another in a middle region of the cross section that is enclosed by the frame part. Here, too, a movable connection may be provided.

The supporting structure may also have multiple frame parts which are arranged adjacent to one another on the cross-sectional area and include in each case a region of the cross-sectional area. It is however also possible for at least two frame parts to be arranged one above the other and/or one on top of the other, wherein in particular, both frame parts enclose the same region of the cross-sectional area. The frame parts may also be arranged in movable fashion and/or rotatably on one another and/or so as to be pivotable relative to one another. Each of the abovementioned frame parts may be connected and/or connectable to at least one further web which points inward from the outer frame part.

It is preferable for at least a part of the second pins to be formed so as to be more movable than a part of the first pins. It is also possible for a part of the first pins to be formed so as to be more movable than a part of the second pins. For this purpose, a part of the first pins and/or second pins may for example be designed to be more elastic than a part of the second pins and/or first pins. In particular, at least a part of the first pins and/or second pins is movable and/or flexible in multiple movement directions. It is preferable for a part of the first pins and/or second pins to be articulatedly connected to the web. Here, "movable" refers in particular to at least a bending movement. It is however also possible, in the region of the first side surface and/or second side surface, for at least one guide to be formed on and/or at the web, which at least one guide holds at least one first pin and/or second pin and preferably permits a (translational and/or sliding) movement of the pin in the guide.

The fact that at least a part of the first pins and/or second pins is formed so as to be more movable than a part of the second pins and/or first pins serves in particular to achieve that the first pins and/or second pins are aligned relative to corresponding cavities of the first honeycomb body and/or of the second honeycomb body. A part refers here in particular to a predefined number of pins. It is preferable for at least 30% of the first pins or second pins to be formed so as to be more movable than at least 30% of the second pins or first pins respectively. In particular, at least 50% of the first pins or second pins are formed so as to be more movable than at least 50% of the second pins or first pins respectively. It is even possible for at least 80% of the first pins or second pins to be formed so as to be more movable than at least 50% of the second pins or first pins respectively.

In general, at least one first pin and/or at least one second pin may be connected in mobile and/or movable fashion to a web. The first pins and/or the second pins are however preferably connected fixedly or positionally fixedly to the web.

It is preferable for the supporting structure to comprise at least one web which is variable at least in terms of a length. It is thus possible for the web to be movable and/or deformable in terms of a length. The length may be variable by way of a pulling and/or stretching action.

In a further expedient embodiment, at least the first pins or the second pins are formed in each case with an elongate body and two mutually oppositely situated tip regions, wherein a pin insulator is arranged at least in the body or at least partially (in encircling fashion) around the body, and at least one tip region is at least partially formed, on the outside, with a metal. The pins preferably have an internally situated, electrically conductive or non-conductive core. The (electrically conductive) core is furthermore preferably at least partially (completely) surrounded with an electrically insulating layer and/or coating. The layer and/or coating is formed in particular in the manner of a hollow cylinder and with ceramic. In particular, at least a tip region, the pin is also electrically insulated in the direction of the pin axis. The pin axis refers in particular to the central axis of the pin. It is furthermore preferable for a metallic layer and/or coating to be applied to the outside of the at least one tip region. This embodiment is however not imperative, because it is also possible for first pins and/or second pins to be formed with an elongate body and with an electrically non-conductive material, for example ceramic, wherein the first pins and/or the second pins are, at least a tip region, at least partially formed and/or surrounded, in particular coated, on the outside with a metal and/or a metal layer.

According to a further aspect, a device for the treatment of exhaust gases is also proposed, comprising at least one first, electrically energizable honeycomb body which has first cavities which may at least partially be passed through by a flow (of a fluid or exhaust gas), and at least one second, adjacently arranged honeycomb body, which has second cavities which are at least partially passed through by a flow (of a fluid or exhaust gas), and at least one supporting structure of the type proposed here arranged between the first honeycomb body and the second honeycomb body, wherein the first pins are directed toward the first honeycomb body and the second pins are directed toward the second honeycomb body, and wherein the supporting structure electrically insulates the first honeycomb body and the second honeycomb body with respect to one another and connects these to one another, wherein the first pins are at least partially connected to first cavities and the second pins are at least partially connected to second cavities.

The first cavities and/or the second cavities are preferably passed through completely by a flow, though this is not imperatively necessary. The second honeycomb body may for example also be formed in the manner of a particle filter or a particle trap, wherein the cavities are in particular formed so as to be closed at one end (in alternating fashion). The cavities are in particular formed and/or delimited by at least one at least partially structured metal layer, foil, grid, nonwoven or the like. The first honeycomb body and/or the second honeycomb body is in particular of metallic form. Furthermore, the first honeycomb body and/or the second honeycomb body preferably forms a metallic catalytic converter substrate body.

The pins are in particular connected to the cavities such that the pins each make contact at least with an inner side of the corresponding cavity and/or are connected to the inner side. The pins are in particular cohesively connected to the cavities and/or to the corresponding inner side. The connection may, depending on the material selected for the pins and/or the honeycomb bodies, be realized by soldering (brazing), welding, sintering or some other process. In particular, in each case one first pin is at least partially connected to a corresponding and/or predefined first cavity, and in each case one second pin is at least partially connected to a corresponding and/or predefined second cavity. It is the case in particular that a greater number of cavities than pins is provided.

It is not imperatively necessary for the first cavities and the second cavities to be arranged in alignment with and/or axially parallel to one another. The supporting structure may in particular compensate a radial and/or axial offset of the first and second cavities, in particular by way of a correspondingly adapted arrangement of the first pins and second pins and more preferably by way of a movement of at least a part of the second pins. The second pins may also be bent and/or flexible, whereby they may then be inserted into the second cavities and/or connected to the second cavities even if the second cavities extend through the second honeycomb body non-parallel with respect to the axial direction.

Preferably, the first honeycomb body has a first face side and the second honeycomb body has a second face side. In particular, the first face side and the second face side face one another. The at least one supporting structure is then arranged between the first side and the second face side. The supporting structure makes contact, in particular, with the first face side and/or the second face side. At least the first face side or the second face side may lie in a (geometrical) plane with the cross-sectional area. The cross-sectional area may also lie in a (geometrical) plane which lies between, and is substantially parallel to, the first face side and the second face side.

The at least one supporting structure and/or the at least one web may thus also span or enclose a part of the first face side and/or of the second face side. In particular, the at least one supporting structure and/or the at least one web may also cover a coverage fraction of the first face side and/or of the second face side. Such a coverage fraction amounts in particular to at most 50%, preferably at most 30% or even only at most 20%. If the coverage fraction is too high, the flow through the honeycomb bodies is impaired to too great an extent, resulting in an excessively high pressure loss in the exhaust-gas aftertreatment system.

The first, energizable honeycomb body has, in particular, subregions which must not come into electrical contact with one another in the energized state. The supporting structure advantageously prevents this because the first pins which support the electrically energizable honeycomb body also prevent the current-conducting subregions from undesirably coming into contact. In particular, those subregions of the electrically energizable honeycomb body which conduct current (in the energized state) are held and/or fixed relative to one another by way of the first pins such that an electrical short circuit between the subregions is prevented. For this purpose, it is the case in particular that insulating gaps are provided between the current-conducting subregions, which gaps are maintained even in the event of thermal expansion of the electrically energizable honeycomb body, preferably by virtue of the pins supporting the electrically energizable honeycomb body and maintaining the insulating gaps. The insulating gaps may be filled with air and/or at least one other insulating medium and/or at least one insulating material. The electrical current flow thus flows over the entire predefined path through the energizable honeycomb body (for example between two electrodes).

Also preferable is a motor vehicle having an exhaust-gas aftertreatment system, a current supply unit and at least one supporting structure proposed here and/or one device proposed here. Furthermore, the motor vehicle may have an internal combustion engine, an exhaust line and a control unit, wherein the control unit may be connectable and/or connected to the current supply unit and to the device proposed here. In this way, control and/or regulation of the device proposed here are/is also possible.

According to a further aspect, a method for producing a device for the treatment of exhaust gases is also proposed, comprising at least the following steps:

(I) providing a first honeycomb body, which has first cavities which are at least partially passed through by a flow, and a second honeycomb body, which has second cavities which are at least partially passed through by a flow, (II) providing a supporting structure of the type proposed here, (III) orienting the supporting structure between the first honeycomb body and the second honeycomb body, wherein the first pins are oriented toward the first honeycomb body and the second pins are oriented toward the second honeycomb body, and wherein the first pins are at least partially inserted into first cavities and the second pins are at least partially inserted into second cavities, (IV) connecting the supporting structure to the first honeycomb body and to the second honeycomb body.

It is preferably the case that, in step (I), at least the first honeycomb body and/or the second honeycomb body is formed by winding or coiling or stacking of at least one at least partially structured metal layer and/or (metal) foil. It is furthermore preferable for a (subsequent) thermal joining process of the metal layer to also be performed in step (I).

If necessary, in step (III), at least a part of the first pins or a part of the second pins is moved relative to the web.

It is also preferable if step (I) comprises production at least of the first honeycomb body or of the second honeycomb body at least the following intermediate steps:

(Ia) generating a metallic honeycomb structure with at least one at least partially structured metallic foil, (Ib) soldering (brazing) or welding the metal honeycomb structure, (Ic) separating off a disk from the metal honeycomb structure in order to form at least the first honeycomb body or the second honeycomb body.

The at least partially structured foil may be formed in particular as an at least partially smooth and/or at least partially corrugated metal layer and/or (metal) foil. In intermediate step (Ia), the at least one at least partially structured foil is in particular wound, coiled and/or stacked. This arrangement is then, in intermediate step (Ib), joined together by way of a soldering process (in particular a high-temperature vacuum soldering process), such that the at least one metallic foil forms a stable metal honeycomb structure. Then, in intermediate step (Ic), in particular by way of a separating process, a preferably narrow disk is separated off and/or cut from the metal honeycomb structure. The separating process may be performed by way of a cutting wire, at least one laser beam or the like. By virtue of a disk being separated off from the metal honeycomb structure, it is possible in particular to realize large diameters in the case of a relatively narrow disk. This approach is expedient in particular if a ratio of (axial) thickness to (radial) diameter of the disk or of the first/second honeycomb body is at least 1:3, 1:5, 1:8 or even 1:12. The metal honeycomb structure is in particular rotationally symmetrical, and/or has a central axis which also defines an axial direction. It is furthermore advantageous that at least two disks are produced from the metal honeycomb structure. The disks may have different extents in an axial direction (thickness). This is however not imperative, because it is also possible for a multiplicity of identical disks to be produced from the metal honeycomb structure.

If the metal honeycomb structure is separated into at least two disks, it is the case in particular that two honeycomb bodies are realized whose cavities are oriented in alignment with and parallel to one another. This is particularly advantageous because an orientation of a supporting structure proposed here is simplified if the two honeycomb bodies have predefined cavities which are aligned with one another. For this purpose, the metal honeycomb structure may be formed, generated, wound, brazed or welded such that the separated-off disks form honeycomb bodies which satisfy both the requirements on a honeycomb body which is electrically energizable and the requirements on a honeycomb body which is not electrically energizable.

It is preferably the case that, in step (IV), the connection is realized by way of a soldering process (brazing process), wherein the first pins are at least partially connected to first cavities, and the second pins are at least partially connected to second cavities. The pins preferably each make contact with at least an inner side of the corresponding cavity. During step (IV), it is furthermore possible for the joining connections in a (further) honeycomb body and/or of at least one honeycomb body to an outer housing to also be formed (at the same time).

The connection of the pins to the honeycomb bodies is consequently preferably realized in cohesive and/or positively locking and/or non-positively locking fashion. "Cohesive" refers to connections in the case of which the connecting partners are held together by atomic and/or molecular forces (so-called "material-to-material connection"). In the case of a connection referred to here as "positively locking", one of the connecting partners stands in the way of another, that is to say at least partially blocks the movement capability of the latter, for example by way of engagement or contact. Here, "non-positively locking" means in particular that the mutual displacement of connecting partners is prevented as long as the opposing force effected by static friction is not exceeded.

The details, advantages and special features discussed above in conjunction with the supporting structure are transferable correspondingly to the device described here and to the method, and vice versa. Furthermore, the details, advantages and special features discussed above in conjunction with the device are transferable correspondingly to the method described here, and vice versa. In this respect, reference is made to the entirety of the statements given there for the purposes of more detailed characterization.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention and the technical field will be discussed in more detail below on the basis of the figures. It is pointed out that the figures show particularly preferred design variants and details of the invention, but the invention is not restricted to these. Here, identical components in the figures are denoted by the same reference designations. In particular, it should not be assumed that all details in one figure must be implemented separately only in the illustrated manner or must arise only in the illustrated combination with one another. If such a situation applies, this will be explicitly stated.

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
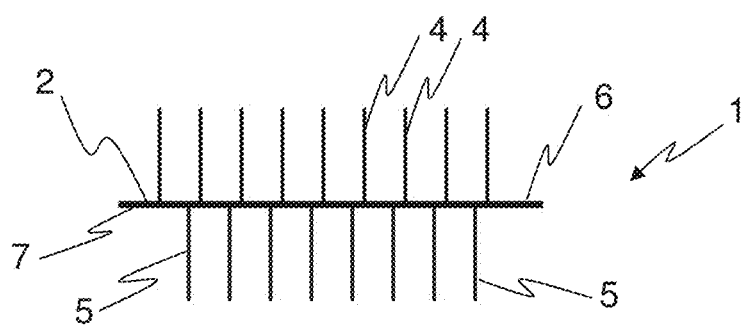
FIG. 1 shows a cross-sectional view of a supporting structure.

FIG. 1 schematically shows a cross-sectional view of a supporting structure 1, having a first side surface 6 and having a second, oppositely situated side surface 7. The supporting structure 1 comprises at least one web 2 which has substantially an elongate and rectangular cross-sectional shape. A multiplicity of first pins 4 extends away from the first side surface 6 and a multiplicity of second pins 5 extends away from the second side surface 7. The first pins 4 and the second pins 5 are held by the web 2.

Figure 2:
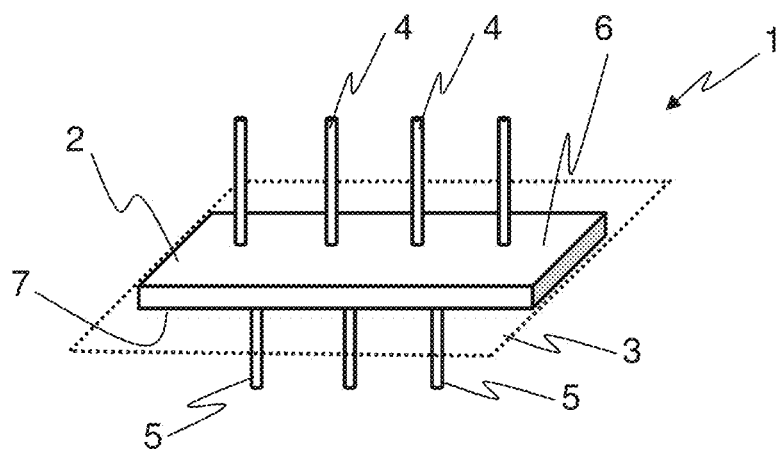
FIG. 2 shows a perspective view of a supporting structure.

FIG. 2 schematically shows a perspective view of a supporting structure 1, in turn having a first side surface 6 and having a second, oppositely situated side surface 7. The web 2 spans the cross-sectional area 3, which is in particular parallel to the first side surface 6 and to the second side surface 7. The cross-sectional area 3 may, as shown, lie (exactly) in a (geometrical) plane with the second side surface 7. The first pins 4 and the second pins 5 extend to both sides of the cross-sectional area 3.

Figure 3:
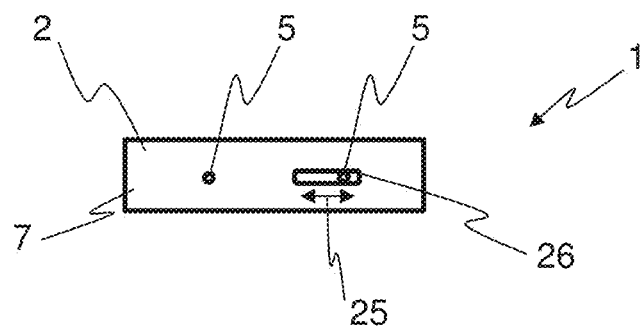
FIG. 3 shows a plan view of a supporting structure with a guide.

FIG. 3 schematically shows a plan view of a supporting structure 1, wherein the plan view is directed towards the second side surface 7. The supporting structure 1 comprises a web 2 which holds two second pins 5. The second pin 5 illustrated on the right is movable in a guide 26. The guide 26 holds the second pin 5 and ensures a movement of the second pin 5 along the (translational) movement direction 25, in this case to the left and to the right. The left-hand second pin 5 is fixedly connected to the web 2.

Figure 4:
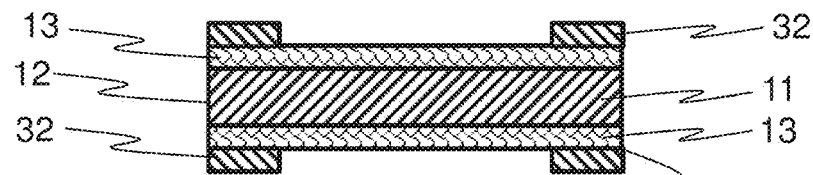
FIG. 4 shows a sectional illustration of a pin.

FIG. 4 schematically shows a sectional illustration of a first pin 4 and/or second pin 5. A body 11 is shown, having a pin insulator 13 which at least partially surrounds the body 11. At the ends of the pin illustrated in this case at the left and at the right, two oppositely situated tip regions 12 are shown. The tip regions 12 are formed with a metal layer 32 on the outside.

Figure 5:
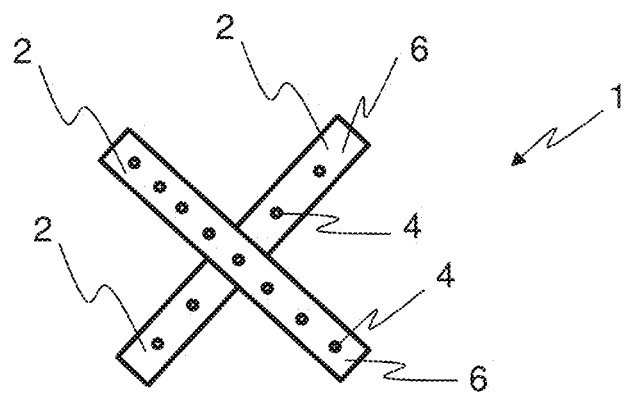
FIG. 5 shows a plan view of a further design variant of the supporting structure.

FIG. 5 schematically shows a plan view of a further design variant of the supporting structure 1. The plan view is directed toward the first side surface 6, and therefore a multiplicity of first pins 4 may be seen. The supporting structure 1 comprises two webs 2 which are arranged in an X shape relative to one another. The webs 2 are connected to one another in the middle.

Figure 6:
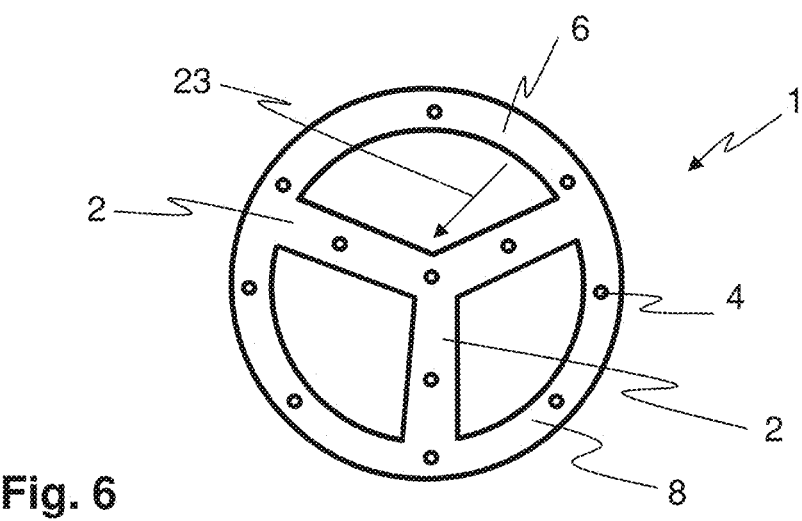
FIG. 6 shows a plan view of a further design variant of the supporting structure.

FIG. 6 schematically shows a plan view of a further design variant of the supporting structure 1. The plan view is directed toward the first side surface 6, and therefore a multiplicity of first pins 4 may be seen. A web 2 forms an outer frame part 8. The frame part 8 is of circular shape and is connected to at least one further web 2, which points inward from the outer frame part 8. By way of example, three further webs 2 are formed here, which further webs point inward from the outer frame part 8 and are connected to one another in the middle. The inward direction 23 is in this case specified as an inwardly pointing radial direction. The outer frame part 8 and the three further webs 2 are in this case formed in one piece. The three further webs 2 are arranged in a Y shape.

Figure 7:
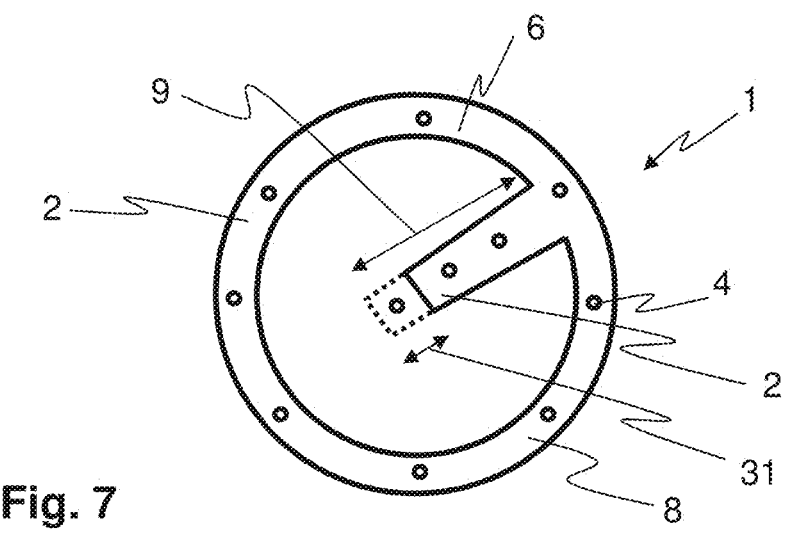
FIG. 7 shows a plan view of a further design variant of the supporting structure with a web which is variable in terms of length.

FIG. 7 schematically shows a plan view of a further design variant of the supporting structure 1, having a web 2 which is variable in terms of length 9, wherein, in this case, too, the plan view is directed toward the first side surface 6, and therefore a multiplicity of first pins 4 may be seen. A web 2 forms an outer frame part 8, and a further web 2 points inward from the outer frame part 8. The further web 2 is variable in length 9. An exemplary change in length 31 of the web 2 is shown.

Figure 8:
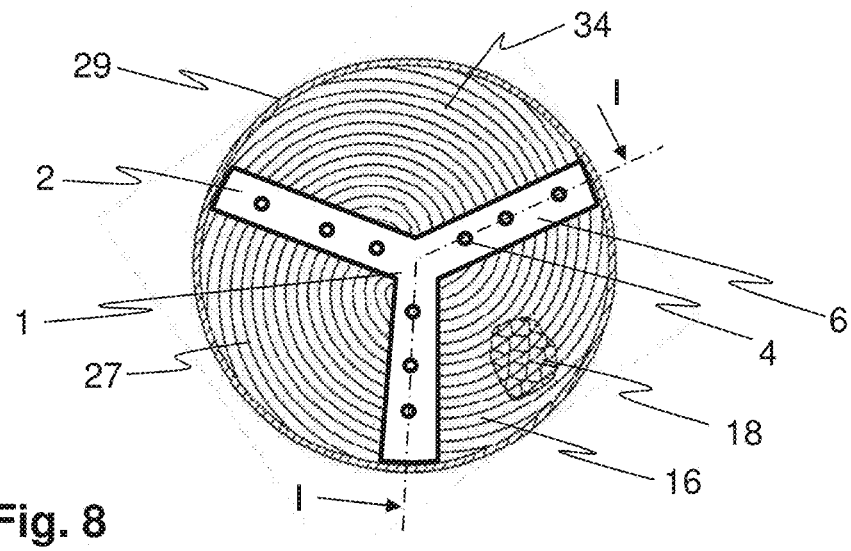
FIG. 8 shows a plan view of a supporting structure which is connected to a second honeycomb body.

FIG. 8 schematically shows a plan view of a supporting structure 1 which is connected to a second honeycomb body 16. The supporting structure 1 comprises, by way of example, three webs 2 which are connected to one another in the middle and which are arranged in a Y shape and/or star shape. In one sub-region, the second cavities 18 of the second honeycomb body 16 are indicated. The second honeycomb body 16 is formed with a multiplicity of foils 27. The plan view is directed toward the first side surface 6 of the supporting structure 1 and the second face side 34 of the second honeycomb body 16, and therefore it is also possible to see a multiplicity of first pins 4. The supporting structure 1 makes contact, by way of example, with the second face side 34, wherein the second face side 34 in this case at least partially forms the cross-sectional area 3. Second pins 5 point into the plane of the drawing and are connected to second cavities 18 of the second honeycomb body 16. The second honeycomb body 16 is delimited radially toward the outside by a casing tube 29.

Figure 9:
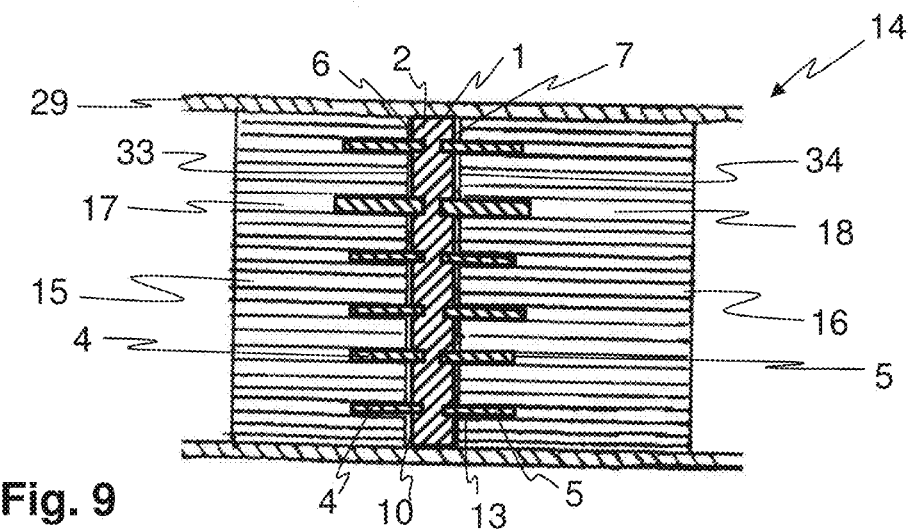
FIG. 9 shows a sectional illustration of a device with a supporting structure.

FIG. 9 schematically shows a sectional illustration of a device 14 having a supporting structure 1. The sectional illustration is, by way of example, illustrated in accordance with the section I-I indicated in FIG. 8. Provision is not made for the supporting structure 1 to completely prevent a flow through the device 14. A first honeycomb body 15 and a second honeycomb body 16 are shown, which are arranged in a casing tube 29 and which are flowed through by an exhaust gas in succession. The supporting structure 1 has the first side surface 6 adjacent to the first honeycomb body 15 and the second side surface 7 adjacent to the second honeycomb body 16. The first side surface 6 may come into contact with the first face side 33 and the second side surface 7 may come into contact with the second face side 34. In the region of the first side surface 6, there is formed an electrical insulator 10 which prevents an electrical current flow 22 from the first honeycomb body 15 to the second honeycomb body 16. By way of example, the insulator 10 is formed with ceramic, and in particular, the first side surface 6 is in this case coated with the insulator 10. Furthermore, an insulating action is provided by way of the pin insulator 13.

The first honeycomb body 15 and the second honeycomb body 16 are connected to one another and supported against one another by way of the supporting structure 1. For this purpose, the first pins 4 engage into first cavities 17 of the first honeycomb body 15 and the second pins 5 engage into second cavities 18 of the second honeycomb body 16. The first pins 4 are at least partially connected to first cavities 17 and the second pins 5 are at least partially connected to second cavities 18. The first pins 4 and the second pins 5 are in this case schematically illustrated. By way of example, different pin lengths and pin diameters are shown. Nevertheless, the first pins 4 and/or the second pins 5 are generally configured uniformly within a device 14.

Figure 10:
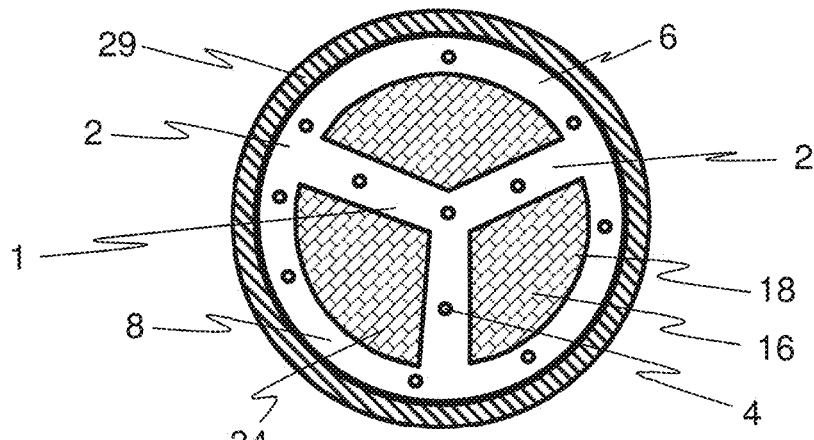
FIG. 10 shows a plan view of a supporting structure which is connected to a second honeycomb body.

FIG. 10 schematically shows a plan view of a supporting structure 1 which is connected to a second honeycomb body 16. The supporting structure 1 comprises, by way of example, three inner webs 2 and an outer frame part 8. Second cavities 18 of the second honeycomb body 16 may be seen, through which an exhaust gas may flow. The plan view is directed toward the first side surface 6 of the supporting structure 1 and the second face side 34 of the second honeycomb body 16, and therefore a multiplicity of first pins 4 may also be seen. The supporting structure 1 lies, for example, against the second face side 34 of the second honeycomb body 16, wherein the second face side 34 at least partially forms the cross-sectional area 3. Second pins 5 point into the plane of the drawing and are connected to second cavities 18 of the second honeycomb body 16. The second honeycomb body 16 is delimited radially to the outside by a casing tube 29.

Figure 11:
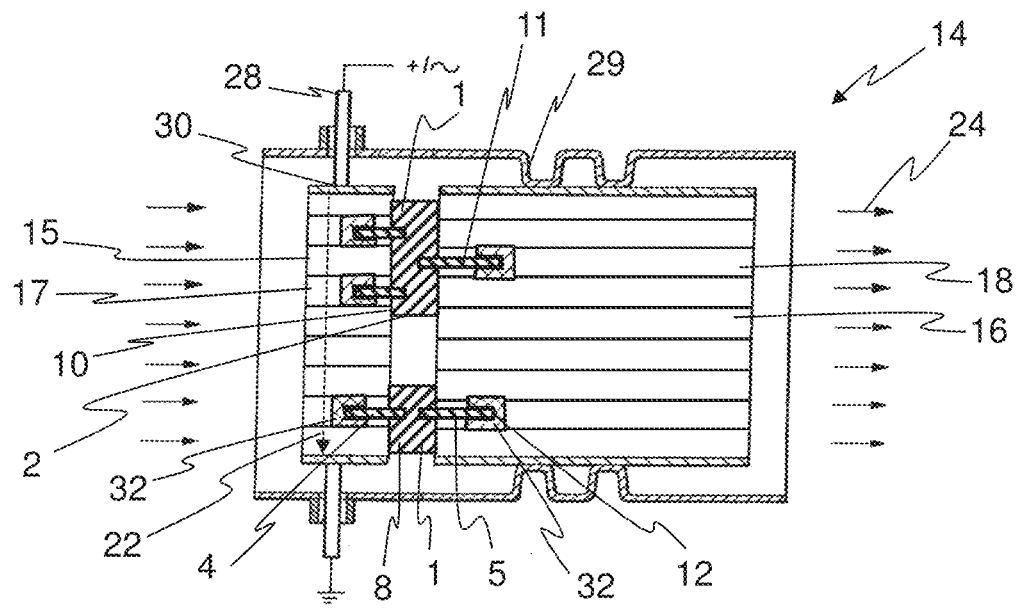
FIG. 11 shows a further sectional illustration of a device with a supporting structure.

FIG. 11 schematically shows a sectional illustration of a device 14 having a supporting structure 1. The sectional illustration shows a section through a supporting structure 1 comprising an outer frame part 8 with at least one further web 2 which points inward from the outer frame part 8. The first pins 4 and the second pins 5 have, by way of example, an electrically non-conductive body 11 and an outer metal layer 32, which surrounds in each case a tip region 12 of the first pin 4 and of the second pin 5. The first pins 4 are at least partially connected to predefined first cavities 17. By way of example, the metal layer 32 of a first pin 4 is at least partially (cohesively) connected to at least an inner side of a predefined first cavity 17. The second pins 5 are at least partially connected to predefined second cavities 18. By way of example, the metal layer 32 of a second pin 5 is at least partially (cohesively) connected to at least an inner side of a predefined second cavity 18.

FIG. 11 furthermore schematically shows, by way of example, the main flow direction 24 of an exhaust gas, which flows through the first honeycomb body 15, the supporting structure 1 and the second honeycomb body 16 in succession. The first, electrically energizable honeycomb body 15 is electrically energized by way of at least one electrical connection 28 and by way of at least one current-distributing structure 30. A current flow 22 thus flows through the first honeycomb body 15.

Figure 12:
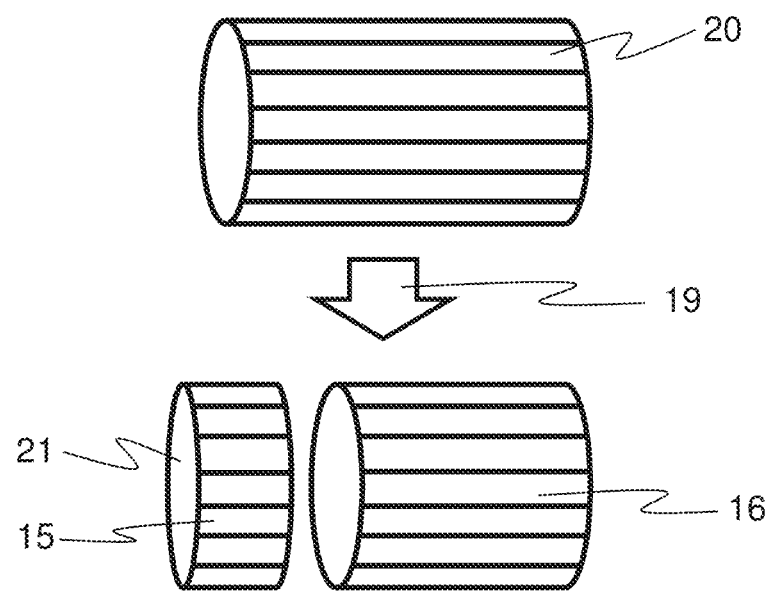
FIG. 12 shows a process of separating off a disk from a metal honeycomb structure.

FIG. 12 schematically shows a process of separating off a disk 21 from a metal honeycomb structure 20. The metal honeycomb structure 20 is formed with at least one at least partially structured foil 27. The metal honeycomb structure 20 is furthermore brazed. By way of a separating process 19, a disk 21 is separated from the metal honeycomb structure 20. The separating process 19 is performed for example by way of a cutting wire. The separating process 19 results in a first honeycomb body 15 and a second honeycomb body 16 being formed.

It is seen that the present invention specifies a supporting structure with which a connection of honeycomb bodies may be realized as easily and quickly as possible. The supporting structure furthermore performs the function of an electrical insulator. Furthermore, the invention specifies a device which is connected easily and quickly, and a method for producing a corresponding device. Furthermore, a method is specified by way of which electrically energizable honeycomb bodies may be produced more easily, in particular narrow electrically energizable honeycomb bodies with a large outer diameter.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A supporting structure, comprising:
   a first side surface;
   a second side surface, oppositely situated relative to the first side surface;
   an electrical insulator which prevents an electrical current flow from passing from the first side surface to the second side surface;
   at least one web which spans a cross-sectional area, such that the web is substantially parallel to the first side surface and the second side surface;
   a plurality of first pins and a plurality of second pins, which extend to both sides of the cross-sectional area, each of the plurality of first pins and each of the plurality of second pins further comprising:
      an elongate body having two mutually oppositely situated tip regions;
      a pin insulator connected to the elongate body; and
      a metal layer formed on the outside of at least one of the tip regions;
      wherein the metal layer is connected to a cavity of a honeycomb body.

2. The supporting structure of claim 1, further comprising:
   an outer frame part, the outer frame part being part of the at least one web; and
   a second web connected to the outer frame part;
   wherein the second web extends inward from the outer frame part.

3. The supporting structure of claim 1, wherein at least a portion of the second pins are movable relative to a portion of the first pins.

4. The supporting structure of claim 1, wherein the at least one web is of a variable length.

5. The supporting structure of claim 1, the pin insulator arranged within the elongate body.

6. The supporting structure of claim 1, the pin insulator arranged at least partially around the elongate body.

7. A device for the treatment of exhaust gases, comprising:
   at least one first, electrically energizable honeycomb body which has a first plurality of cavities;
   at least one second honeycomb body having a second plurality of cavities, the second honeycomb body adjacently arranged relative to the first honeycomb body; and
   at least one supporting structure arranged between and connecting the first honeycomb body to the second honeycomb body such that the supporting structure electrically insulates the first honeycomb body from the second honeycomb body, the at least one supporting structure further comprising:
   a first plurality of pins directed toward the first honeycomb body such that at least a portion of the first plurality of pins are connected to the first plurality of cavities;
   a second plurality of pins directed toward the second honeycomb body such that at least a portion of the second plurality of pins are connected to the second plurality of cavities;
   each of the plurality of first pins and each of the plurality of second pins further comprising:
      an elongate body having two mutually oppositely situated tip regions;
      a pin insulator connected to the elongate body; and
      a metal layer formed on the outside of at least one of the tip regions, and the metal layer is connected to a cavity of a honeycomb body;
   wherein a flow passes through the first plurality of cavities and the second plurality of cavities.

* * * * *